United States Patent Office 3,072,610
Patented Jan. 8, 1963

3,072,610
POLYMERIZATION OF FORMALDEHYDE
Helmuth Kritzler, Koln-Fliitard, and Kuno Wagner, Leverkusen, Germany, assignors to Farbenfabriken Bayer Aktiengesellschaft, Leverkusen, Germany, a corporation of Germany
No Drawing. Filed Feb. 9, 1960, Ser. No. 7,523
Claims priority, application Germany Feb. 14, 1959
6 Claims. (Cl. 260—67)

The present invention relates to the polymerization of formaldehyde, and more especially to the activation of said polymerization by means of carbodiimides.

It is known that formaldehyde can be polymerized in the presence of catalysts to form polyoxymethylenes of high molecular weight. As suitable catalysts for this purpose, tertiary bases have hitherto been mainly employed, such as for example trimethylamine and tributylamine, and also quaternary bases, organometallic compounds and metal alcoholates.

It has now been found that carbodiimides are especially suitable as catalysts for the production of thermoplastic formaldehyde polymerization products of high molecular weight. The carbodiimides as such are known compounds and contain a structural unit of the formula —N=C=N— in which the free valences of the nitrogen atoms are saturated by organic radicals.

The compounds employed as catalysts in the process according to the present invention are distinguished on the one hand by their high catalytic activity in the polymerization of formaldehyde, and on the other hand they serve to remove the last traces of water, and also take up acid, especially formic acid. The corresponding ureas or acyl ureas are formed in a reaction which proceeds quickly. An additional technical advance arising from the use of carbodiimides as polymerization catalysts is that they do not have to be removed from the polymerization products after completion of the reaction, since they are also effective in catalyzing the acylation of the polymers formed, which reaction is usually employed for stabilizing the polymerized formaldehyde (our co-pending application Serial No. 1,856, filed January 12, 1960). The addition of carbodiimides, with the stabilizing reaction by acylation (as described in the aforementioned application) does in fact lead to considerable increases in the yield of the products thereby obtained. One important advantage in the use of carbodiimides when producing polyoxymethylenes of high molecular weight is furthermore based on the fact that carbodiimides, which are non-basic substances, prevent basically catalyzed secondary reactions, such as for example aldol condensation, taking place and thus prevent reactions which can lead to branching of the polyoxymethylene chain.

For carrying out the process of the invention, substantially anhydrous, monomeric, gaseous or liquid formaldehyde is introduced into an inert, substantially anhydrous organic solvent, to which the catalyst is added either before, during or after the introduction of formaldehyde. For the preparation of a suitable anhydrous formaldehyde with a water content of less than 0.5 percent, and preferably less than 0.1 percent, a well-known procedure is as follows: paraformaldehyde, α-polyoxymethylene or trioxane is subjected to thermal decomposition at a temperature of about 90 to 170° C. The monomeric formaldehyde is then preferably conveyed through a cooling system at a temperature of from —15 to —20° C. By this means residues of water are frozen out or removed by partial polymerization of the formaldehyde. The formaldehyde can then be supplied to the reaction vessel in gaseous or liquid form.

As inert solvents there may for instance be used cyclic and acyclic ethers such as dimethyl ether, diethyl ether, dipropyl ether, dibutyl ether, dioxan, tetrahydrofuran, esters, especially esters of saturated alcohols with saturated carboxylic acids such as propylacetate, butylacetate, aliphatic, cycloaliphatic aromatic hydrocarbons such as butane, hexane, heptane, cyclohexane, benzene, toluene, xylene, halogenated, especially chlorinated hydrocarbons such as methylenedichloride, chloroform, carbontetrachloride, ethylenedichloride, chlorobenzene, and dichlorobenzene. The quantity of solvent employed may be varied within wide limits. There are preferably employed from 3 to 100, preferably 5 to 20 parts by volume of solvent for each part by weight of formaldehyde.

Suitable carbodiimides for carrying out the process of the invention are carbodiimides of the aliphatic, cycloaliphatic, araliphatic and aromatic series, both of symmetrical and asymmetrical structure. Suitable carbodiimides correspond for instance to general formula:

$$R_1—N=C=N—R_2$$

in which $R_1$ and $R_2$ stand for an alkyl group having 1 to 20, preferably 2 to 6 carbon atoms (methyl, ethyl, n-propyl, iso-propyl, n-butyl, tertiary butyl, hexyl, dodecyl, octadecyl), an aromatic group (phenyl, tolyl, ethyl phenyl, nitrophenyl, chlorophenyl, alkoxy phenyl such as methoxyphenyl, ethoxyphenyl, butoxyphenyl), naphthyl, a cycloaliphatic group (cyclohexyl, methylcyclohexyl, cyclopentyl) or an araliphatic group (benzyl). Examples of such compounds are diethyl carbodiimide, diisopropyl carbodiimide, dicyclohexyl carbodiimide, methyl-n-propyl carbodiimide, dibenzyl carbodiimide, diphenyl carbodiimide, p,p'-ditolylcarbodiimide and di-naphthyl carbodiimide, or substituted derivatives of the said carbodiimides. In addition, it is likewise possible to employ polyfunctional carbodiimides that is to say organic compounds which contain at least two groups of the formula —N=C=N— each free valence of the nitrogen atoms being saturated by a carbon atom forming part of an aliphatic, cycloalphatic, araliphatic or aromatic hydrocarbon radical in which the aromatic groups may be substituted besides by hydrocarbon radicals, by nitro halogen or alkoxy groups as defined above. Compounds of this type correspond for instance to the general formula $R_2—N=C=N—R—N=C=N—R_1$, in which formula $R_1$ and $R_2$ have the same meaning as above and R stands for a bivalent organic radical such as alkylene having 2 to 8 carbon atoms, six membered cycloalkylene, which may be substituted by lower alkyl, arylene such as phenylene, naphthylene which may be substituted as above, and aralkylene such as xylene. Examples of such carbodiimides are tetramethylene $\omega,\omega'$-bis-tert.-butyl carbodiimide and hexamethylene $\omega,\omega'$-bis-tert.-butyl carbodiimide.

It is advantageous to use carbodiimides which comprise at least one nitrogen atom which in its turn is bonded to a secondary or tertiary carbon atom, such as for example methyl-tert.-butyl carbodiimide, tertiary butyl isopropyl carbodiimide, isopropyl benzyl carbodiimide and others. Carbodiimides of this structure have a substantially lesser tendency to self-polymerization than aromatically substituted carbodiimides. The aforementioned compounds can be used by themselves as catalysts, or they may be employed in combination with one another.

The catalysts employed in the process according to the present invention may be introduced into the reaction vessel as such or in the form of a solution. It is preferable to dissolve the catalyst in the same solvent as that in which the reaction is to be carried out.

The quantity of catalyst employed may be varied within wide limits. From 0.2 to 0.000001 mol of catalyst is preferably employed for every 1000 parts by volume of solvent. The best results are, however, obtained when using from 0.1 to 0.000001 mol of catalyst per 1000 parts by volume of solvent or 0.001 to 0.1 mol per 100 grams of formaldehyde.

In the present process, the reaction temperature can be varied within wide limits, for example between −120° C. and +100° C.; it is, however preferred to carry out the process at a temperature of from −90° C. to +70° C.

The flow velocity of the formaldehyde is likewise variable and depends on the one hand on the speed of pyrolysis and on the other hand on the temperature in the polymerization vessel. It may be advantageous to mix the monomeric formaldehyde with an inert carrier gas, as for instance nitrogen, argon, or helium. After the reaction has taken place, the polymerization product is separated from the solvent, for example by filtration or centrifuging. The process may also be carried out continuously; fresh catalyst can be added to the reaction medium at a rate corresponding to the rate of removal of the polymer product.

The products obtained by the process according to the present invention can be stabilized by known methods of acylation or etherification, for example, as described in patent application Serial No. 1,856.

The high molecular weight polyoxymethylenes prepared by the process according to the present invention and stabilized by the processes just referred to can be worked up to form high-grade plastics with or without additives, such as for example aromatic amine or phenol anti-oxidants and if desired, in the presence of fillers, plasticizers and the like.

Example 1

Paraformaldehyde is subjected to thermal decomposition at 120–130° C. in order to produce monomeric formaldehyde. The monomeric formaldehyde thus produced is mixed in the pyrolysis vessel with pure, dry nitrogen (1 part by volume of formaldehyde and about 8 parts by volume of nitrogen) and thereafter is conducted through five conventional cold traps maintained at a temperature of −20° C. In a second cooling system, at −85° C., the formaldehyde is liquefied and the liquefied formaldehyde is supplied to the polymerization vessel. The reaction vessel is provided with an inlet union for formaldehyde, a mechanical stirrer mechanism and a gas-outlet pipe. 0.126 part by weight of diisopropyl carbodiimide, dissolved in 3 parts by volume of anhydrous toluene, are added to 1000 parts by volume of anhydrous toluene and the resulting solution is introduced into the reaction vessel. The formaldehyde is added dropwise over a period of 3 hours, and while stirring, to the reaction medium cooled to −20° C., whereby polymerization takes place. After stirring for another hour at −20° C., the polymerization product is filtered off and freed from adhering solvent by pressing. A pure white polyoxymethylene of high molecular weight is obtained, and this is extracted by stirring twice with methanol and twice with acetone and finally is dried in vacuo at 60° C. The yield is 157 g., this amounting to 98% of the formaldehyde (160 gms.) actually introduced into the reaction vessel. The intrinsic viscosity of the formaldehyde polymer, measured in a 0.5% butyrolactone solution at 150° C., is 0.5.

Example 2

The procedure is in principle as described in Example 1, but 0.042 part by weight of diisopropyl carbodiimide, dissolved in 3 parts by volume of anhydrous toluene, are introduced into 1000 parts by volume of anhydrous toluene. The liquid monomeric formaldehyde in introduced dropwise over a period of 1½–2 hours. A pure white reaction product is obtained after working up as described in Example 1. The yield is 86 gms., this amounting to 97% of the formaldehyde (89 gms.) actually introduced into the reaction vessel. The intrinsic viscosity of the polymer is 2.99 (measured at 150° C. in a 0.5% butyrolactone solution).

Example 3

Monomeric formaldehyde, which has been obtained by pyrolysis of paraformaldehyde as in Example 1, is mixed with pure dry nitrogen as carrier gas and conducted through a cooling system at a temperature of −20° C. Located in the reaction vessel are 1000 parts by volume of anhydrous toluene, to which have been added 0.0618 part by weight of dicyclohexyl carbodiimide dissolved in 10 parts by volume of anhydrous toluene. Gaseous monomeric formaldehyde is introduced into the reaction vessel over a period of 4 hours while stirring and cooling to −20° C. An opaque suspension of polyoxymethylene of high molecular weight is formed. When polymerization is completed, the reaction product is separated by filtration and freed from any adhering solvent by pressing. The polymer is extracted by stirring twice with methanol and twice with acetone and thereafter is dried in vacuo. 193 gms. of pure white polyoxymethylene are obtained, corresponding to a yield of 97% (based on the quantity of formaldehyde (=199 gms.) actually introduced into the reaction vessel). The intrinsic viscosity of the product thus obtained is 1.91 (measured in a 0.5% butyrolactone solution at 150° C.).

Example 4

Monomeric, anhydrous formaldehyde is introduced as described in Example 3 into a solution of 0.0616 part by weight of di-tert.-butyl carbodiimide in 1000 parts by volume of anhydrous toluene. The temperature of the polymerization vessel is kept during this time at −20° C. Polymerization is complete after 2½ hours. The resulting formaldehyde polymer is separated from the solvent, extracted by stirring with methanol and acetone and thereafter dried in vacuo. A polyoxymethylene of high molecular weight and having an intrinsic viscosity of 1.76 (measured at 150° C. in a 0.5% butyrolactone solution) is obtained. The yield is 131 gms., corresponding to 96%, based on the quantity of formaldehyde (=136.5 gms.) actually introduced into the reaction vessel.

Instead of the di-tert.-butyl carbodiimide there may also be used the equivalent amounts of diphenyl carbodiimide or dibenzylcarbodiimide.

Example 5

Monomeric, anhydrous, gaseous formaldehyde is introduced as described in Example 3 into a solution of 0.0375 part by weight of tetramethylene-$\omega,\omega'$-bis-tert.-butyl carbodiimide in 1000 parts by volume of anhydrous toluene, the solution being cooled to −20° C. The polymerization is complete after 2 hours. The resulting formaldehyde polymer is filtered off and extracted by stirring with methanol and acetone. After drying in vacuo, 97 gms. of pure white polyoxymethylene of high molecular weight are obtained, that is to say, 98% of the quantity of formaldehyde (99 gms.) actually introduced into the reaction vessel. The intrinsic viscosity of the polymer is 1.29 (measured at 150° C. in a 0.5% butyrolactone solution). The polymers obtained according to the above mentioned examples may be stabilized by acylating them according to the process of copending application Serial No. 1,856 especially as disclosed in any of the examples thereof.

What is claimed is:

1. A process for the production of high molecular weight polyoxymethylenes which comprises contacting substantially anhydrous, monomeric formaldehyde in an inert organic solvent with catalytic amounts of an open chain carbodiimide selected from the group consisting of aliphatic, cycloaliphatic, and araliphatic carbodiimides thereby causing the formaldeydhe to polymerize.

2. A process as claimed in claim 1, wherein the carbodiimide contains at least one nitrogen atom attached to a carbon atom selected from the group consisting of secondary and tertiary carbon atoms forming part of a radical selected from the group consisting of aliphatic, cycloaliphatic and araliphatic radicals.

3. A process as claimed in claim 1, wherein the temperature of the inert solvent is kept at about −120° to +100° C.

4. A process as claimed in claim 1, wherein said solvent is present in an amount of about 2 to 100 parts by volume per 1 part by weight of formaldehyde and said carbodiimide is present in an amount of about 0.2 to 0.000001 mol per 1000 parts by volume of solvent.

5. A process as claimed in claim 1, wherein said carbodiimide is a compound corresponding to a formula selected from the group consisting of the formulae $$R_1-N=C=N-R_2$$

and $R_2-N=C=N-R-N=C=N-R_1$, in which $R_1$ and $R_2$ stand for substituents selected from the group consisting of alkyl of 10–20 carbon atoms, aryl, cycloalkyl, and aralkyl and R stands for a bivalent organic radical selected from the group consisting of alkylene of 2–8 carbon atoms, cycloalkylene having 6 members in the ring, arylene and aralkylene.

6. A process for the production of high molecular weight polyoxymethylenes which comprises contacting substantially anhydrous monomeric formaldehyde at a temperature of from about −120° C. to +100° C. in an inert organic solvent with a carbodiimide catalyst in an amount of about 0.2–0.000001 mol per 100 parts by volume of solvent, the carbodiimide being an open chain carbodiimide selected from the group consisting of aliphatic, cycloaliphatic, and araliphatic carbodiimides, thereby causing the formaldehyde to polymerize.

References Cited in the file of this patent

UNITED STATES PATENTS 2,844,561    Bechtold et al. _____ July 22, 1958